(12) United States Patent
Mayville et al.

(10) Patent No.: US 10,675,974 B2
(45) Date of Patent: Jun. 9, 2020

(54) 360° ROTATABLE HANDLE SHIFTER WITH SHIFTER POSITION RESET FUNCTIONALITY IN LIEU OF ROTATING HANDLE TO A FIXED POSITION

(71) Applicant: KUSTER NORTH AMERICA, INC., Troy, MI (US)

(72) Inventors: Brian Mayville, Northville, MI (US); Yong Qiang Wang, Troy, MI (US); Christopher Soave, Brighton, MI (US); Christopher Curtis, Orion, MI (US); Scott Hengy, Davison, MI (US)

(73) Assignee: Kuster North America, Inc., Troy, MI (US)

( * ) Notice: Subject to any disclaimer, the term of this patent is extended or adjusted under 35 U.S.C. 154(b) by 251 days.

(21) Appl. No.: 15/910,073

(22) Filed: Mar. 2, 2018

(65) Prior Publication Data

US 2018/0257488 A1 Sep. 13, 2018

Related U.S. Application Data

(60) Provisional application No. 62/469,946, filed on Mar. 10, 2017.

(51) Int. Cl.
*B60K 28/12* (2006.01)
*F16H 59/08* (2006.01)
(Continued)

(52) U.S. Cl.
CPC ............ *B60K 28/12* (2013.01); *B60Q 1/2661* (2013.01); *F16H 59/08* (2013.01); *F16H 59/50* (2013.01);
(Continued)

(58) Field of Classification Search
CPC ................ F16H 59/08; F16H 59/0278; F16H 2059/081; F16H 2059/0295; F16H 61/22;
(Continued)

(56) References Cited

U.S. PATENT DOCUMENTS 4,892,014 A * 1/1990 Morell .................... F16H 59/08
192/222
5,161,422 A 11/1992 Suman et al.
(Continued)

FOREIGN PATENT DOCUMENTS

EP         1987271 A1 * 11/2008  ............ B60K 37/06
KR   20120139881 A  * 12/2012
(Continued)

*Primary Examiner* — Jake Cook
*Assistant Examiner* — T. Scott Fix
(74) *Attorney, Agent, or Firm* — Dinsmore & Shohl LLP

(57) ABSTRACT

A rotary shifter with 360° rotation in each of clockwise and counter clockwise rotating directions. The shifter includes a package housing with a bezel cover. A cylindrical shaped plunger housing is secured to a rotary knob supported atop the housing and which is selectively rotatable in the clockwise direction from a Park gear position, in succession, to each of a Reverse gear position, a Neutral gear position and at least one Drive gear position, with further clockwise rotation preventing movement beyond a final one of the Drive gear positions. The knob is further selectively rotatable in a counter clockwise direction to return to the Park gear position, with additional permitted counter-clockwise rotation retaining the shifter in the Park gear position.

11 Claims, 5 Drawing Sheets

(51) Int. Cl.
*B60Q 1/26* (2006.01)
*F16H 63/48* (2006.01)
*F16H 59/50* (2006.01)
*F16H 63/38* (2006.01)

(52) U.S. Cl.
CPC ............. *F16H 63/38* (2013.01); *F16H 63/48* (2013.01); *F16H 63/483* (2013.01); *B60Y 2300/70* (2013.01); *F16H 2059/081* (2013.01)

(58) Field of Classification Search
CPC .. F16H 61/24; F16H 61/0204; F16H 61/0006; F16H 63/38; F16H 2061/241; F16H 2061/243; F16H 2061/245; F16H 2061/247; F16H 2061/026; F16H 2061/223; F16H 2061/226; B60K 37/06; Y10T 74/2014; Y10T 74/20098; Y10T 74/20128; Y10T 74/1418; Y10T 74/1424; H01H 9/16; G05G 5/02; G05G 5/03; G05G 5/04; G05G 5/06; G05G 5/065; G05G 5/08
USPC ............. 74/473.21, 473.23, 473.24, 473.25, 74/473.26, 473.28
See application file for complete search history.

(56) References Cited

U.S. PATENT DOCUMENTS

| | | | |
|---|---|---|---|
| 6,564,661 B2* | 5/2003 | DeJonge | B60K 37/06 74/335 |
| 7,571,662 B2 | 8/2009 | Pickering et al. | |
| 7,971,498 B2 | 7/2011 | Meyer et al. | |
| 8,170,757 B2 | 5/2012 | Furhoff et al. | |
| 8,648,689 B2* | 2/2014 | Hathaway | B60K 28/12 292/216 |
| 9,021,913 B2 | 5/2015 | Kamoshida et al. | |
| 9,212,740 B2 | 12/2015 | Watanabe et al. | |
| 9,410,614 B2 | 8/2016 | Muraki et al. | |
| 2006/0037424 A1 | 2/2006 | Pickering et al. | |
| 2007/0137358 A1 | 6/2007 | Vigil | |
| 2007/0261509 A1 | 11/2007 | Meyer et al. | |
| 2008/0196541 A1 | 8/2008 | Kramlich | |
| 2009/0064809 A1 | 3/2009 | Miret et al. | |
| 2009/0107287 A1 | 4/2009 | Seki | |
| 2011/0025488 A1 | 2/2011 | Leon | |
| 2011/0301818 A1 | 12/2011 | Hamade et al. | |
| 2012/0143409 A1 | 6/2012 | Curtis et al. | |
| 2012/0260763 A1 | 10/2012 | Terao et al. | |
| 2013/0313086 A1* | 11/2013 | Redwood | F16H 59/02 200/61.88 |
| 2014/0007726 A1 | 1/2014 | Muraki et al. | |
| 2015/0027861 A1* | 1/2015 | Hoskins | F16H 59/08 200/43.11 |
| 2015/0152958 A1 | 6/2015 | Watanabe et al. | |
| 2015/0159747 A1 | 6/2015 | Hoskins et al. | |
| 2015/0167827 A1 | 6/2015 | Fett et al. | |
| 2015/0266376 A1 | 9/2015 | Tokumo et al. | |
| 2015/0369357 A1* | 12/2015 | Lee | F16H 59/08 74/504 |
| 2016/0017983 A1 | 1/2016 | Levesque et al. | |

FOREIGN PATENT DOCUMENTS

| | | | | |
|---|---|---|---|---|
| WO | WO-2004021540 A1 * | 3/2004 | ............ | H01H 19/11 |
| WO | WO-2017055898 A1 * | 4/2017 | ............ | F16H 61/22 |

* cited by examiner

US 10,675,974 B2

360° ROTATABLE HANDLE SHIFTER WITH SHIFTER POSITION RESET FUNCTIONALITY IN LIEU OF ROTATING HANDLE TO A FIXED POSITION

CROSS REFERENCE TO RELATED APPLICATIONS

The present application claims the priority of U.S. Ser. No. 62/469,946 filed Mar. 10, 2017.

BACKGROUND OF THE INVENTION

Field of the Invention

The present invention discloses a 360° degree rotary shifter illustrates a rotary knob with 360° rotation in either of clockwise or counterclockwise rotational directions. From the Park position, one manifestation of the knob includes rotating clockwise to each of the Reverse, Neutral, Drive and (optionally) Sport/Overdrive positions (counter clockwise rotation causing the shifter to remain in Park as dictated by embedded software, with this feature also in effect for continued clockwise rotation beyond each of the Drive or Overdrive/Sport positions).

Software further provides for resetting of the shifter to the Park position in response to an input signal from an external sensor such as associated with a seatbelt latch, door latch or the like. As indicated, resetting of the shifter to the Park position occurs via the software component without instructing movement of any components (notably the rotary knob). The ability to eliminate all physical stoppers dictating knob rotation allows for resetting of the gear position (other than in Park) to the Park position by the software alone, dispensing with the need for Park lock or return to Park mechanisms attendant with the prior art. In this fashion, the software will only allow four or five positions (PRNDS) when the knob is rotated in either direction.

A PCB (printed circuit) board is incorporated into a rotary shifter package assembly along with rotary knob, bezel, housing, and plunger housing assembly. A plurality of light pipes communicate with surface position indicators for each of the Park and rotated RND positions. As further described, pairs of LEDS (one for back lighting, the other for gear indication) are integrated into the PCB and located underneath a bottom location of each light pipe.

An underside of the plunger housing also integrates a magnet which, upon rotating the housing, adjusts a magnetic field sensed by an position sensor within the PCB board (such as which is understood further to be any suitable type of inductive or magnetic Hall effect sensor) in order to detect a rotated knob position. Guided rotation between the knob integrated plunger housing and the outer package supporting housing is assisted by a pair of opposing steel balls and supporting detent springs which are integrated into opposite radial extending bottom portions which guide the rotation of the knob relative to an opposing and perimeter extending detent profile defined within an inner rim surface of the package housing. The configuration of the detent profile is further such that it provides clear tactile/haptic feel of a given shift position.

Background of the Relevant Art

The prior art is documented with various examples of rotary shifter assemblies exhibiting 360 degree rotation functionality, examples of which are depicted in FIGS. 1A-1D. These include general illustrations for each of commercially known shifters associated with existing vehicles including each of Land Rover (at 2 in FIG. 1A), Chrysler 200 (at 4 in FIG. 1B), Ford Fusion (at 6 in FIG. 1C) and Jaguar (at 8 in FIG. 1D) platforms.

Other examples known from the prior patent art include U.S. Pat. No. 6,564,661, to DeJonge, which teaches a storable shifter with electronic gear shift reset. As referenced in the abstract, the shifter apparatus as most broadly described, includes a driver interface module (DIM) 21 movable to request a transmission shift, and a display 23 with indicia for showing the presently selected gear position and for showing a newly selected gear position.

The enlarged perspective of FIG. 8 in DeJonge '661 is particularly referenced as illustrating the collection of features associated with the DIM module 21, such being read in combination with the specification of the disclosure beginning on column 4, lines 32 et seq. Additional features include a controller 26 which is operably coupled to the driver interface module 21, the display, and sensors 25 for sensing predetermined vehicle conditions. The controller 26 shifts the transmission and changes the display if the vehicle sensors 25 indicate that the predetermined vehicle conditions are met, but doesn't shift the transmission if the predetermined vehicle conditions are not met and further it resets the display to the first indicia. By this arrangement, the shifter senses and shifts based on relative position of the DIM and not absolute position. The shifter is storable and covers can be used to hide it when in the storage position.

Other known examples include each of the shift controller of Curtis, US 2012/0143409, the rotary control knob assembly of Miret, US 2009/0064809, and the rotary selector mechanism of Pickering US 2006/0037424 (also U.S. Pat. No. 7,571,662). Leon, US 2011/0025488 depicts a basic example of a rotary shifter with controller for commanding a display between first and second indicia based upon a knob selected position.

SUMMARY OF THE PRESENT INVENTION

The present invention teaches a rotary shifter with 360° rotation in each of clockwise and counter clockwise rotating directions. The shifter includes a package housing with a bezel cover. A cylindrical shaped plunger housing is secured to a rotary knob supported atop the housing and which is selectively rotatable in the clockwise direction from a Park gear position, in succession, to each of a Reverse gear position, a Neutral gear position and at least one Drive gear position, with further clockwise rotation preventing movement beyond a final one of the Drive gear positions. The knob is further selectively rotatable in a counter clockwise direction to return to the Park gear position, with additional permitted counter-clockwise rotation retaining the shifter in the Park gear position.

A PCB board is integrated into the housing, an underside of the plunger housing extending in proximity to the PCB board. The plunger housing further includes a magnet located in proximity to a position sensor integrated into the PCB board and, upon rotating the plunger housing relative to the package housing as guided by an inwardly facing and perimeter defining detent profile established therebetween, adjusting a magnetic field sensed by a position sensor within the PCB board in order to detect a rotated knob position.

At least one external sensor associated with at least one of a door latch or a seatbelt latch and, upon experiencing a triggering condition, communicating with software integrated into the PCB board for resetting the gear shift position to Park without movement of the knob.

Other features include the plunger housing having a pair of lower and opposite and radial projecting guiding portions, these being interiorly hollowed for receiving a pair of opposing steel balls and supporting detent springs. The rotary knob further includes an underside collar affixing within an open upper rim interior of the plunger housing which is in turn mounted through the bezel cover opening and a further opening associated with the main package housing so that the radial projecting portions align with angled surfaces associated with the inwardly facing detent profile, the outwardly spring influenced steel balls being supported within the open interior of the radial portions interacting in tactile induced fashion with the detent profile edges defined within the inner rim surface of the package housing to establish guided rotation of the knob.

Yet additional features include a knob seal providing support between an underside interface between the rotary knob and a receiving profile of the plunger housing. A plurality of light pipes are associated with each of the Park, Reverse, Neutral and at least one Drive gear positions, the light pipes being arranged within the housing so that bottom open ends are in communication with individual LED's integrated into the PCB board. The individual LED's further include pairs of LED's for providing each of backlighting and gear indication respectively for each shifter position.

BRIEF DESCRIPTION OF THE DRAWINGS

Reference will now be made to the attached illustrations, when read in combination with the following detailed description, wherein like reference numerals refer to like parts throughout the several views: and in which.

DETAILED DESCRIPTION OF THE PREFERRED EMBODIMENTS

Figure 1A:
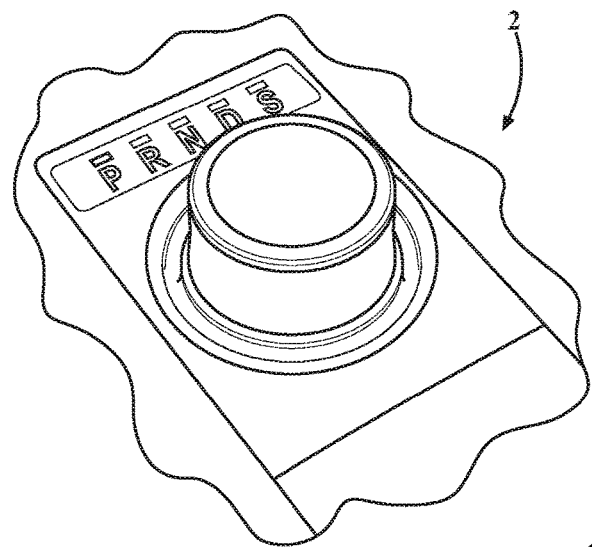
FIGS. 1A-1D are illustrations of prior art examples of rotary shifters with 360 degree rotation functionality according to the Prior Art.
Figure 1B:
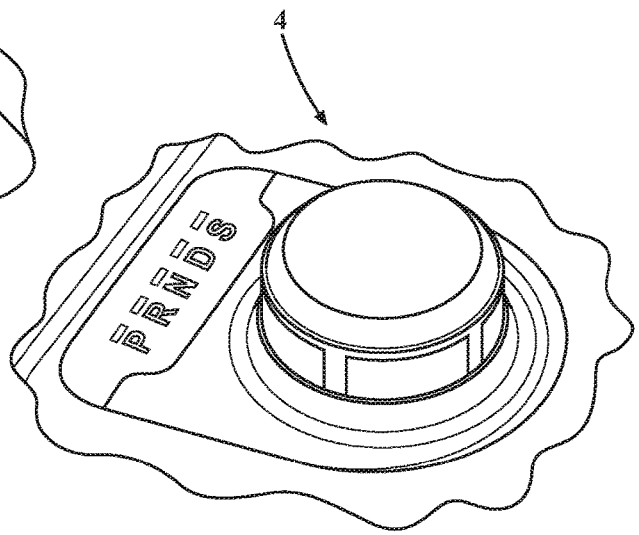
Figure 1C:
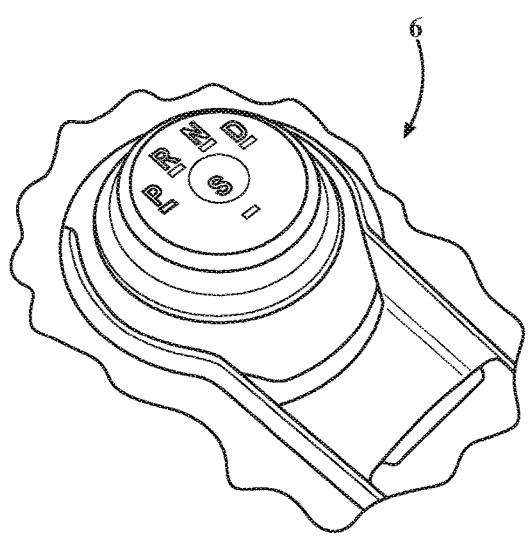
Figure 1D:
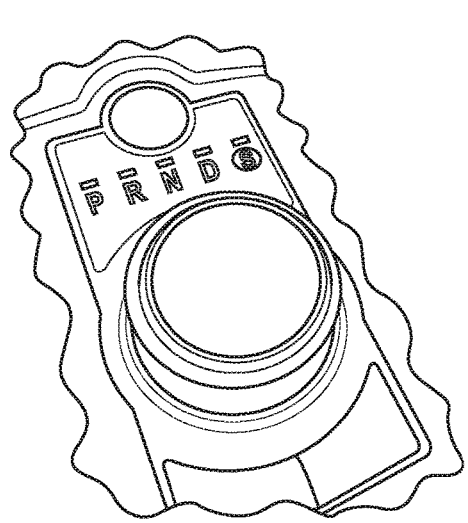
Figure 2:
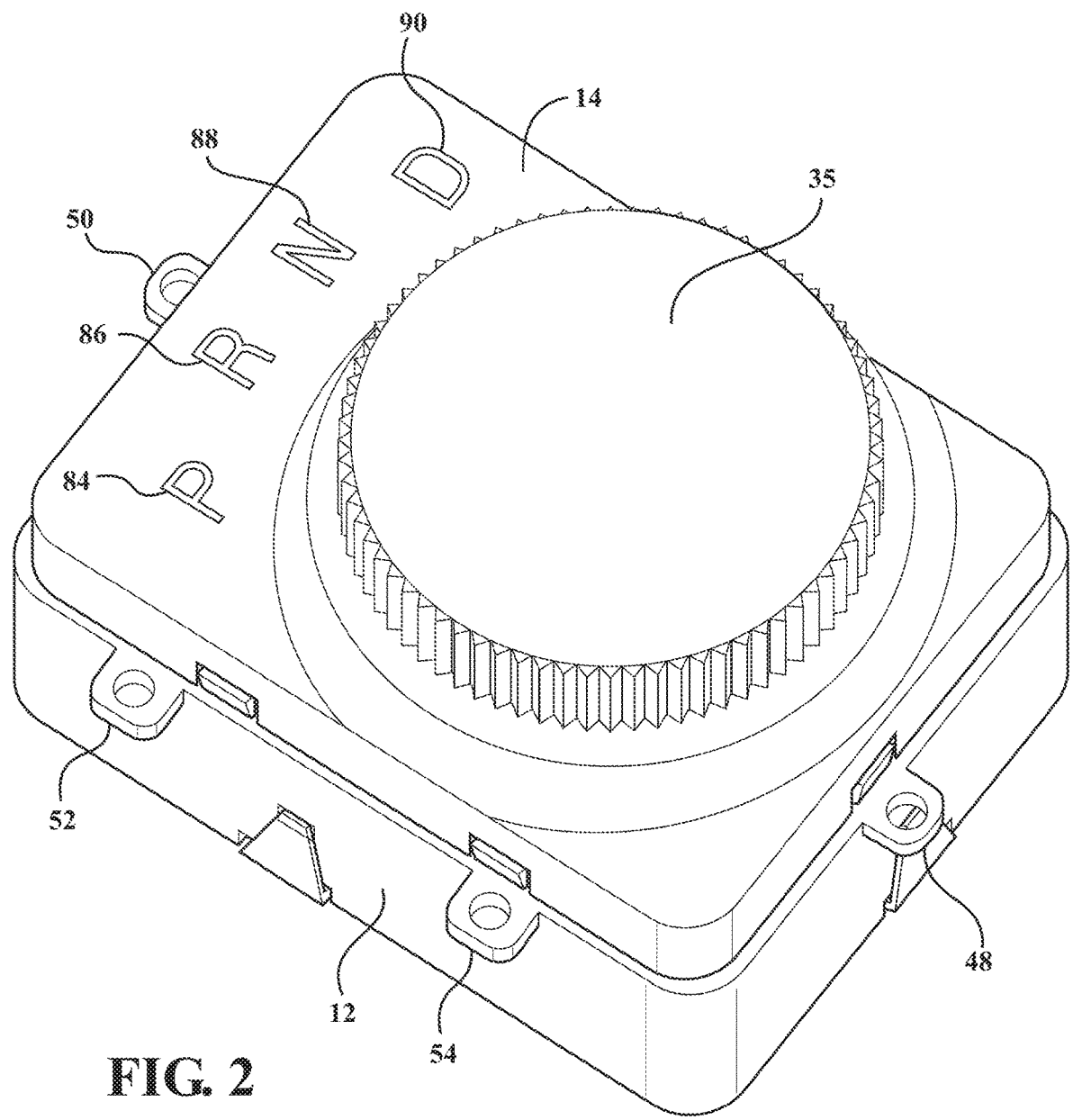
FIG. 2 is a plan view of a rotary shifter according to one non-limiting variant of the present invention and depicting a rotary knob which can shift between each of Park, Reverse, Neutral and Drive positions.
Figure 3:
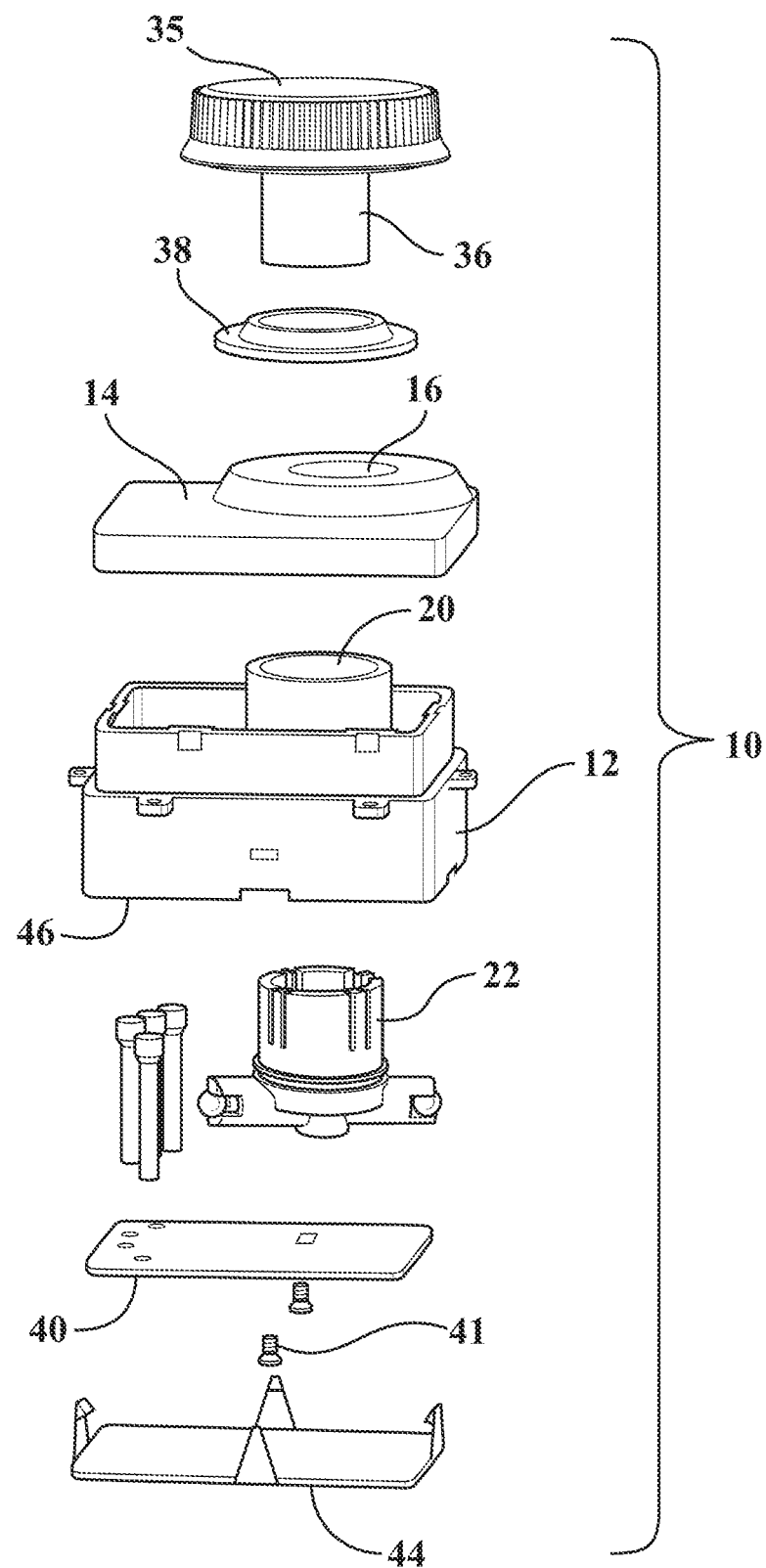
FIG. 3 is an exploded view of the rotary shifter package with 360 degree rotation functionality according to one non-limiting variant of the present invention.
Figure 4:
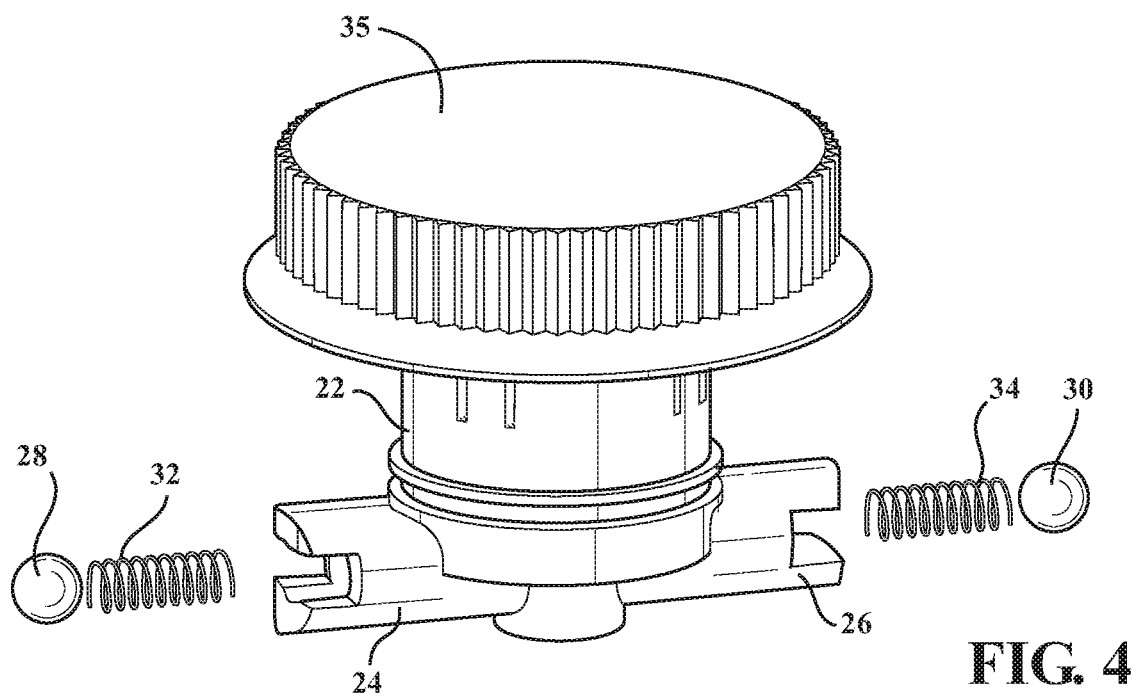
FIG. 4 is an exploded perspective of the rotary knob and plunger housing subassembly.

With reference now to FIGS. 2-6, the present invention discloses a rotary shifter with 360 degree rotation functionality. FIG. 3 provides an exploded view of the rotary shifter package, generally at 10, according to one non-limiting variant of the present invention.

With further reference to each of FIGS. 2 and 3, the shifter assembly includes a main package defining and three dimensional rectangular shaped housing 12 over which is attached a bezel cover 14. The bezel cover further includes an annular opening (see inner rim 16 in FIG. 3) defined within and which provides a receiving access to the features of the rotary knob subassembly as will be further described.

Figure 5:
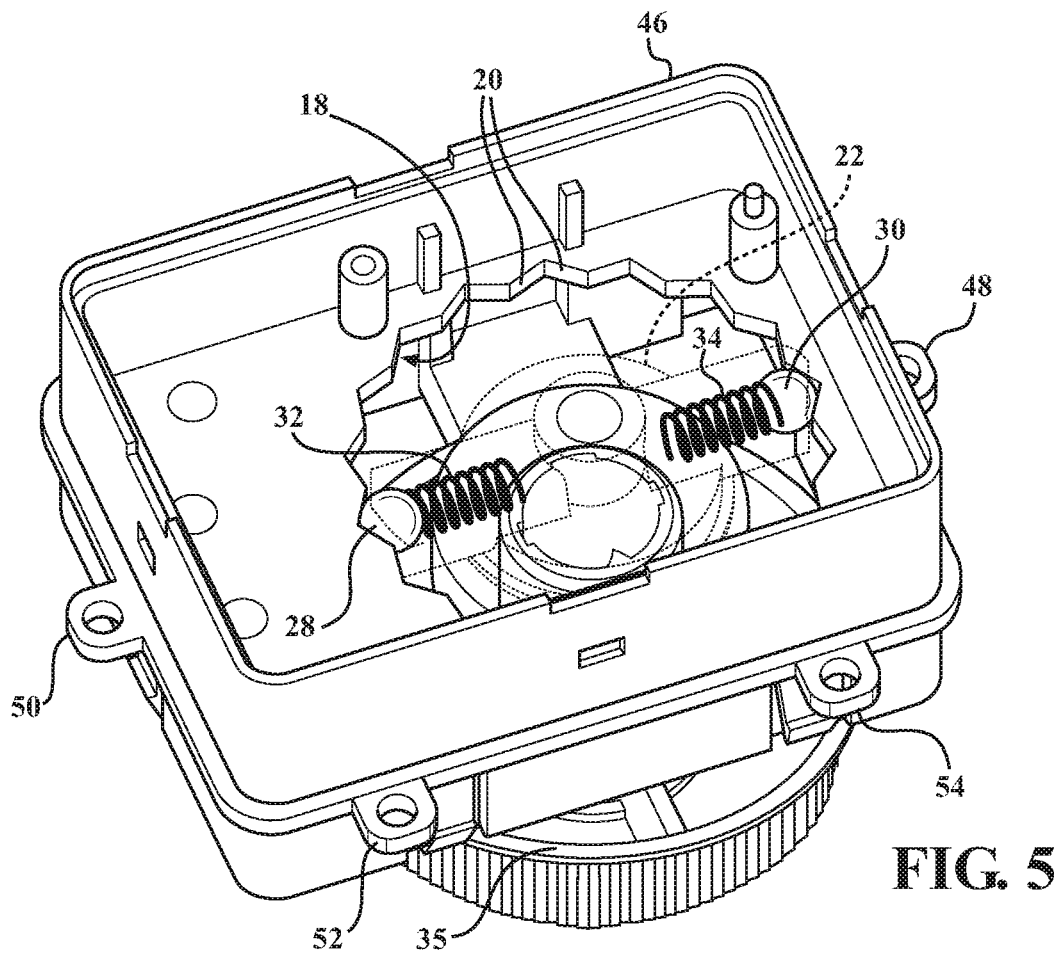
FIG. 5 is an underside assembled view depicting guided rotation between the knob integrated plunger housing and the outer package supporting housing assisted by a pair of opposing steel balls and supporting detent springs which are integrated into opposite radial extending bottom portions which guide the rotation of the knob relative to an opposing and perimeter extending detent profile defined within an inner rim surface of the package housing, the configuration of the detent profile further providing clear tactile/haptic feel of a given shift position and further ensures that the knob will be returned to center at all gear positions.

As further depicted in the underside perspective of FIG. 5, an inner aperture defining rim incorporated into the main package housing 12 exhibits a perimeter extending detent profile 18, which is defined by a plurality of shortened inter-connecting and angled surfaces 20 arranged in a reciprocating pattern approximating a pseudo-circular and polygonal serrated inner profile. A generally cylindrical shaped plunger housing 22 associated with the rotary knob subassembly is provided and includes a pair of lower and opposite and radial projecting guiding portions 24 and 26, these being interiorly hollowed and configured at opposite ends 25 and 27 (FIG. 4) for receiving a pair of opposing steel balls 28/30 and supporting detent springs 32/34.

A rotary knob 35 includes an underside collar 36 (see FIG. 3) affixing within an open upper rim interior of the plunger housing 22. Upon the bezel cover 14 being mounted atop the main packaging housing 12 (see rectangular side windows 15 for bezel 14 which receive aligning tabs 17 projecting outwardly from the upper rim of the main package housing 12), and the plunger housing 22 being mounted through the bezel cover opening 16 and a further opening 20 associated with the main package housing 12 (with the knob 34 rotatably supported upon the annular rim of the bezel cover 14 surrounding the opening 16), the radial projecting portions 24/26 align with the inwardly facing detent profile 18. The outwardly spring influenced steel balls 28/30 supported within the open interior of the radial portions 24/26 interact in tactile induced fashion with the detent profile edges 18 defined within the inner rim surface of the package housing (see again as best shown in FIG. 5) to establish guided rotation of the knob 34 relative thereto. In this manner, the configuration of the detent profile further provides a clear tactile/haptic feel of a given shift position and, as will be described, further ensures that the knob will be returned to center at all gear positions.

The rotary knob 35 further includes a knob seal 38 (shown in FIG. 3) which provides support between the underside interface between the rotary knob collar 36 and the receiving profile of the plunger housing 22.

An underneath located printed circuit (PCB) board is depicted at 40. As further shown in FIG. 3, the PCB 40 is located at the generally bottom of the package interior, secured by screws 42 with a bottom cover 44 supported underneath the PCB 40 (the PCB 40 and bottom cover 44 having aligning pairs of apertures 39 and 41, respectively which receive the screws 42), this in turn mating with an underside outer rectangular rim edge 46 of the main housing 12. As further best shown in FIG. 2, the outer package housing 12 can include peripheral mounting tabs or portions (see at 48, 50, 52 and 54) for mounting the overall assembly within a vehicle environment. Also shown are tabs 43 projecting from the bottom cover 44 which seat within receiving apertures 45 provided along aligning bottom edges of the main housing 12 in order to assembly the package housing together as best depicted in FIGS. 2-3

An underside of the plunger housing 22 also integrates a magnet 56 (see FIG. 8) which, upon rotating the housing 22 relative to the main package housing 12 and as guided by the internal detent profile 18, adjusts a magnetic field sensed by a position sensor 58 within the PCB board 40 (such as which is understood further to be any suitable type of inductive or magnetic Hall effect sensor) in order to detect a rotated knob position.

A plurality of light pipes are provided and include each of a Park position light pipe 60, Reverse position light pipe 62, Neutral position light pipe 64, and Drive position light pipe 66. Each of the light pipes 60-66 are supported within the package housing so that bottom open ends are in communication with individual pairs of LED's integrated into the PCB board 40.

Figure 6:
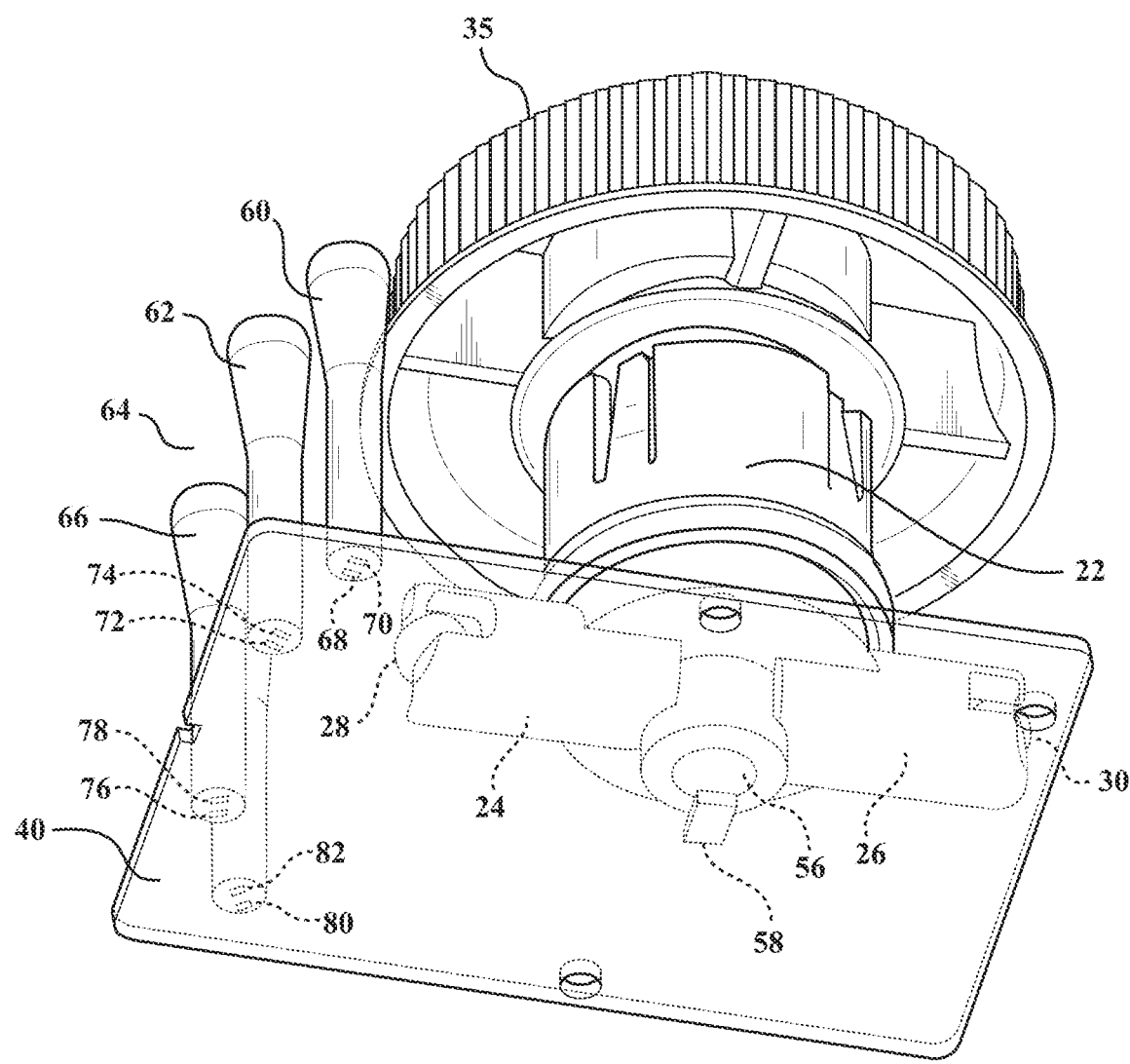
FIG. 6 is a partial and inverted underside illustration of the illuminating and outer packaging components of the rotary shifter with bezel cover, main package housing and bottom cover removed in order to illustrate an arrangement of PRND light pipes along with depicting a sensor and LED supporting printed circuit (PCB) board, the LED elements being provided in respective pairs for providing both back lighting and gear indication for each shifter position and further depicting an underside of the plunger housing also integrating a magnet which, upon rotating the housing, adjusts a magnetic field sensed by an position sensor within the PCB board, such as which is understood further to be any suitable type of inductive or magnetic Hall effect sensor, in order to detect a rotated knob position.

The LED's are shown in the underside perspective of FIG. 6 and include include individual pairs at 68/70 for center Park light pipe 60, 72/74 for Reverse light pipe 62, 76/78 for Neutral light pipe 64 and 80/82 for Drive light pipe 66. Pairing of LED's provides one each for backlighting and gear indication respectively. Reference is also made to the illuminating PRND locations (see at 84, 86, 88 and 90, respectively) formed into the top bezel cover 14 in FIG. 2. As previously described, modifications of the rotary shifter can also include additional Sport (S) or other gear drive shifter positions.

In this fashion, the present invention discloses a 360° degree rotary shifter in which the rotary knob can rotate 360° in either of first clockwise or second counterclockwise rotational directions with detent feel. Further, and if the gear position remains in any gear other than Park while the driver is preparing to exit the vehicle, the remote switch will be triggered and will instruct the shifter software integrated into the PCB 40 to "reset" the knob current position as Park and without any component movement having occurred.

As will be further described, software further provides for resetting of the shifter to the Park position in response to an input signal from an external sensor such as associated with a seatbelt latch, door latch or the like. As indicated, resetting of the shifter to the Park position occurs via the software component without instructing movement of any components (notably the rotary knob). The ability to eliminate all physical stoppers dictating knob rotation allows for resetting of the gear position (other than in Park) to the Park position by the software alone, dispensing with the need for Park lock or return to Park mechanisms attendant with the prior art.

Having described our invention, other and additional embodiments will become apparent to those skilled in the art to which it pertains, and without deviating from the scope of the appended claims:

We claim:

1. A rotary shifter with 360° rotation in each of clockwise and counter clockwise rotating directions, said shifter comprising:
 a package housing with a bezel cover;
 a cylindrical shaped plunger housing to which is secured
  a rotary knob, a pair of lower and opposite radial projecting guiding portions which are interiorly hollowed at opposite end faces for receiving a pair of spheres and supporting detent springs, said end faces further including notches for seating said spheres in a compressed state against said springs;
 said knob being selectively rotatable in the clockwise direction from a Park gear position in succession to each of a Reverse gear position, a Neutral gear position and at least one Drive gear position;
 said knob being selectively rotatable in a counter clockwise direction to return to the Park gear position, with additional permitted counter-clockwise rotation retaining the shifter in the Park gear position;
 a PCB board integrated into the package housing;
 an underside of said plunger housing extending in proximity to said PCB board, said plunger housing further including a magnet located in proximity to a position sensor integrated into the PCB board and, upon rotating said plunger housing relative to said package housing as guided by an inwardly facing and perimeter defining detent profile against which is biased said spheres, adjusting a magnetic field sensed by said position sensor within said PCB board in order to detect a rotated knob position; and
 at least one external sensor associated with at least one of a door latch or a seatbelt latch and, upon experiencing a triggering condition, communicating with software integrated into said PCB board for resetting the gear shift position to Park without movement of said knob.

2. The rotary shifter as described in claim 1, said rotary knob further comprising an underside collar affixing within an open upper rim interior of said plunger housing which is in turn mounted through said bezel cover opening and a further opening associated with said main package housing so that said radial projecting guiding portions align with angled surfaces associated with said inwardly facing detent profile, said outwardly spring influenced spheres supported within said open interior of said radial portions interacting in tactile induced fashion with said detent profile edges defined within said upper rim interior of said package housing to establish guided rotation of said knob.

3. The rotary shifter as described in claim 2, further comprising a knob seal providing support between an underside interface between said rotary knob and a receiving profile of said plunger housing.

4. The rotary shifter as described in claim 3, further comprising a plurality of light pipes associated with each of the Park, Reverse, Neutral and at least one Drive gear positions, each of said light pipes being arranged within said housing and having an open bottom in communication with an LED integrated into said PCB board.

5. The rotary shifter as described in claim 4, said LED's each further comprising a pair of LEDs associated with each of said light pipes for providing each of backlighting and gear indication respectively for each shifter position.

6. A rotary shifter with 360° rotation in each of clockwise and counter clockwise rotating directions, comprising:
 a knob supported atop a housing and being selectively rotatable in a first direction from a Park gear position in succession to each of a Reverse gear position, a Neutral gear position and at least one Drive gear position;
 said knob also being selectively rotatable in a second counter direction from any of the Reverse, Neutral and Drive gear positions to return to the Park gear position;
 a PCB board integrated into a bottom interior of said housing;
 a plunger assembly secured to said knob and extending within said housing, a pair of lower and opposite radial projecting guiding portions which are interiorly hollowed at opposite end faces for receiving a pair of spheres and supporting detent springs, said end faces further including notches for seating said spheres in a compressed state against said springs;

an underside of said plunger housing arranged in proximity to said PCB board, said plunger housing further including a magnet secured to an end thereof and located in proximity to a position sensor integrated into the PCB board such that, upon rotating said plunger housing relative to said package housing as guided by an inwardly facing and perimeter defining detent profile against which is biased said spheres, adjusting a magnetic field sensed by said position sensor within said PCB board in order to detect a rotated knob position; and at least one external sensor associated with at least one of a door latch or a seatbelt latch and, upon experiencing a triggering condition, communicating with software integrated into said PCB board for resetting the gear shift position to Park without movement of said knob.

7. The rotary shifter as described in claim 6, said rotary knob further comprising an underside collar affixing within an open upper rim interior of said plunger housing which is in turn mounted through said bezel cover opening and a further opening associated with said main package housing so that said radial projecting guiding portions align with angled surfaces associated with said inwardly facing detent profile, said outwardly spring influenced spheres supported within said open interior of said radial portions interacting in tactile induced fashion with said detent profile edges defined within said upper rim interior of said package housing to establish guided rotation of said knob.

8. The rotary shifter as described in claim 7, further comprising a knob seal providing support between an underside interface between said rotary knob and a receiving profile of said plunger housing.

9. The rotary shifter as described in claim 8, further comprising a plurality of light pipes associated with each of the Park, Reverse, Neutral and at least one Drive gear positions, each of said light pipes being arranged within said housing and having an open bottom in communication with an LED integrated into said PCB board.

10. The rotary shifter as described in claim 9, said LED's each further comprising a pair of LEDs associated with each of said light pipes for providing each of backlighting and gear indication respectively for each shifter position.

11. A rotary shifter with 360° rotation in each of clockwise and counter clockwise rotating directions, said shifter comprising:

a package housing with a bezel cover;

a cylindrical shaped plunger housing to which is secured a rotary knob, a pair of lower and opposite radial projecting guiding portions which are interiorly hollowed at opposite end faces for receiving a pair of detent elements and supporting detent springs, said end faces further including notches for seating said detent elements in a compressed state against said springs;

said knob being selectively rotatable in the clockwise direction from a Park gear position in succession to each of a Reverse gear position, a Neutral gear position and at least one Drive gear position;

said knob being selectively rotatable in a counter clockwise direction to return to the Park gear position, with additional permitted counter-clockwise rotation retaining the shifter in the Park gear position;

a PCB board integrated into the package housing;

an underside of said plunger housing extending in proximity to said PCB board, said plunger housing further including a magnet located in proximity to a position sensor integrated into the PCB board and, upon rotating said plunger housing relative to said package housing as guided by an inwardly facing and perimeter defining detent profile against which is biased said detent elements, adjusting a magnetic field sensed by said position sensor within said PCB board in order to detect a rotated knob position, said detent profile further including a plurality of inter-connecting and angled surfaces arranged in a reciprocating pattern; and at least one external sensor associated with at least one of a door latch or a seatbelt latch and, upon experiencing a triggering condition, communicating with software integrated into said PCB board for resetting the gear shift position to Park without movement of said knob.

* * * * *